Nov. 27, 1945.　　　　F. A. LEISEN　　　　2,389,917
AIRCRAFT STRUCTURE
Filed Oct. 16, 1941　　　2 Sheets-Sheet 1
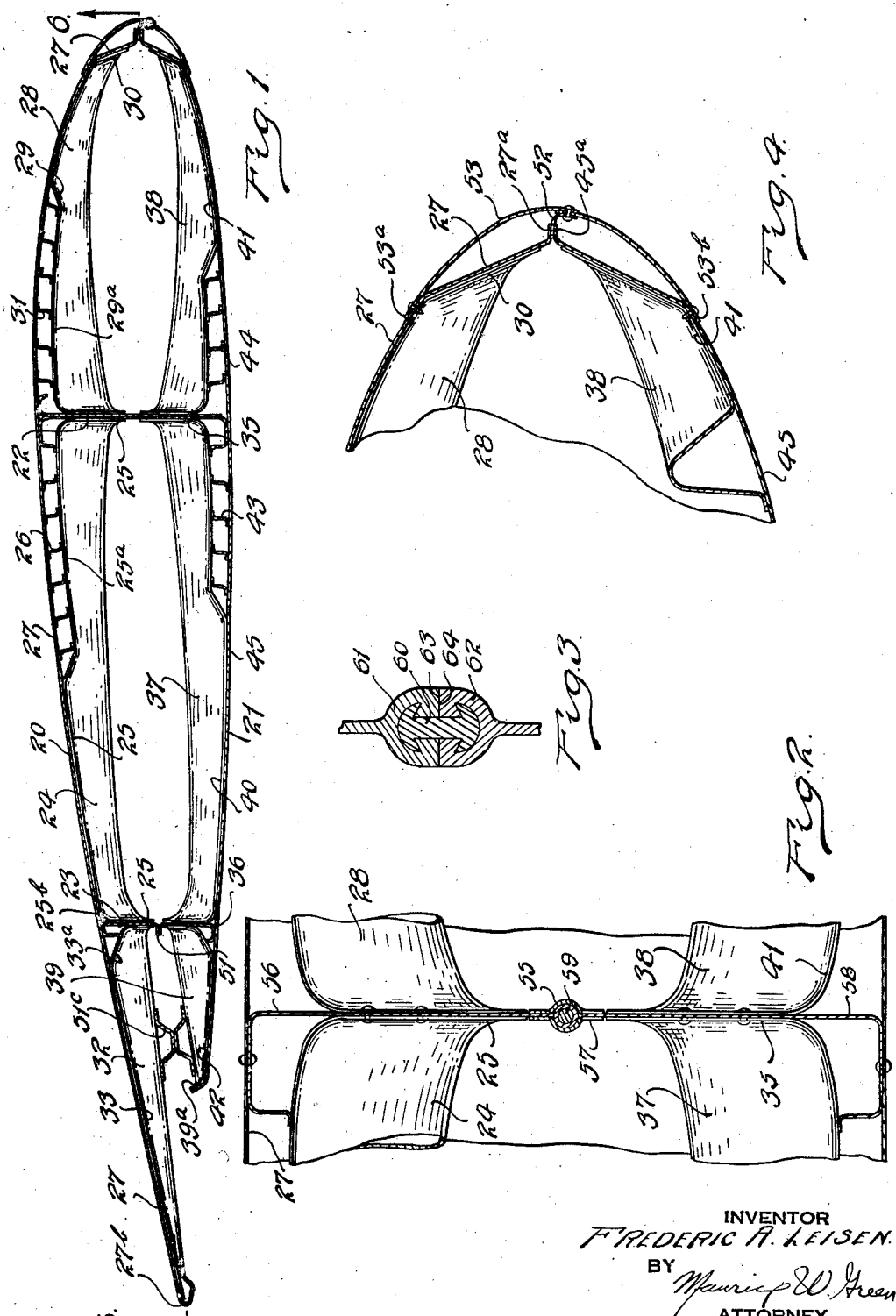
INVENTOR
FREDERIC A. LEISEN.
BY
ATTORNEY Nov. 27, 1945.   F. A. LEISEN   2,389,917
AIRCRAFT STRUCTURE
Filed Oct. 16, 1941    2 Sheets-Sheet 2

INVENTOR
FREDERIC A. LEISEN.
BY
ATTORNEY

Patented Nov. 27, 1945

2,389,917

UNITED STATES PATENT OFFICE 2,389,917

AIRCRAFT STRUCTURE

Frederic A. Leisen, Grosse Pointe Farms, Mich.

Application October 16, 1941, Serial No. 415,162

8 Claims. (Cl. 244—123)

This invention relates to improvements in airplane wing structures and methods of assembling same. In constructing wings for aircraft it is necessary to employ a structure which will be capable of holding an outer skin or covering in a desired shape during its passage through the air, and by this structure to transfer the loads from the wing to the body of the airplane. It is of extreme importance that the outside shape of the wing be well defined and definitely held at all times and further that the structure enclosed by the skin covering be capable of supporting the loads imposed. In order to accomplish the above outlined result it is necessary to have a framework of relatively large number of parts, and it has been generally constructed by first assembling the interior framework in quite complete detail and later assembling the covering or skin as a final operation. Earlier wings were constructed of wood and cloth, but as the art progressed the use of metal became of greater importance. At the present time it is very common to use a complete metal construction including the structural shapes of the frame as well as the skin covering. A great percentage of the metal construction has been riveted construction, but it is also a recent development to use metal capable of welding. The earlier constructions of metal of course required an excessive amount of labor in assembling, and it has been considered that the inaccessibility of many parts to be worked upon greatly reduces the possibility of using many quantity production methods which would otherwise be possible.

The present methods of construction for metal wings and other aircraft parts would be greatly facilitated if a type of construction could be worked out which would leave the parts to be assembled together easily accessible at all steps in the process of assembly and the parts so arranged as to simplify rather than complicate the necessary manufacturing processes, and it is, therefore, a primary object of the present invention to make practical for use a type of structure capable of carrying the loads imposed but of such arrangement that the parts thereof may be reasonably accessible during assembly and thereby produce a structure particularly adaptable for quantity production methods.

It is a further object to provide a type of structure and method of assembly which will enable the use of standard structural shapes in a major portion of the structure and to minimize the requirement for special shapes.

It is another object to provide rib section parts having a securing flange continuous on one side and the ends thereof for the purpose of effectively securing the spars, skin and rib sections of the structure together and with offset portions in the rib sections adjacent the ends near the spar sections to receive structural shapes between the rib sections and the skin adjacent the spar sections.

It is a further object to provide a method of construction whereby metal aircraft structures may be built in such manner that at all times during the several steps in assembly the portions to be assembled together are easily accessible for the use of production machinery for assembling the portions together.

It is a further object to produce a structure particularly adaptable for use when an upper and lower half of a wing are built up separately and subsequently assembled together, although important features of the construction are adaptable for use in various types of structures.

It is another object to make available a construction for the leading edge portion of an aircraft structure which can be efficiently assembled by production methods and at the same time produce a satisfactory structure at the leading edge from the standpoint of both strength and shape.

The above and other objects of the invention will appear more fully from the following more detailed description and by reference to the accompanying drawings forming a part hereof and wherein:

Fig. 1 is a cross section of the wing structure showing the spar and rib sections and the outside covering, this section being taken in the direction of flight near the connection of the wing to the fuselage.

Fig. 2 is a cross section thru a spar section farther out on the wing than is shown in Fig. 1 and shows a cross section thru the piano hinge joint shown at the right hand side of the perspective view Fig. 5.

Fig. 3 is a modified form of joint intended to be used in place of the piano hinge joint shown in Fig. 3 and Fig. 5.

Fig. 4 is an enlarged section of the leading edge of the wing shown in Fig. 1 and also includes a cross section of one of the rib channel members.

Figure 5:
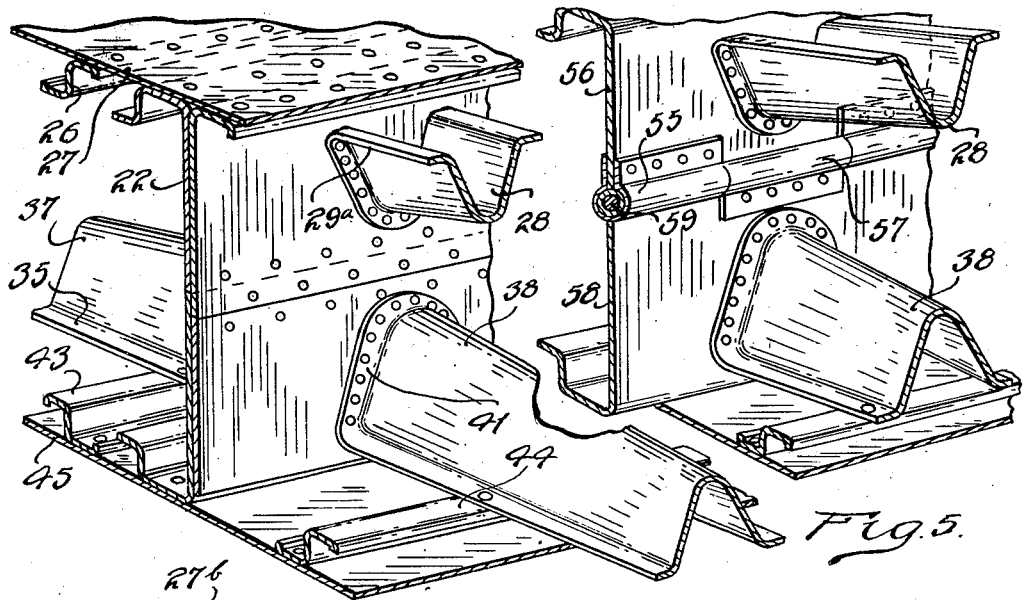
Fig. 5 is a perspective view showing a section thru a spar at a point relatively near the root section where the wing is attached to the fuselage and the view being outward in perspective along the spar and showing the transition from the type of joint shown in Fig. 1 to the type of joint shown in Figs. 2 or 3 for the sections of the wing farther removed from the fuselage.

Referring to the drawings, Fig. 1 shows a cross sectional view of a wing made in accordance with the proposed construction, the section taken being substantially parallel with the direction of flight with the leading edge at the right hand end as viewed in Fig. 1. In the description of the structure the term "spar" will be applied to generally classify structural members extending spanwise of the wing, i. e. substantially perpendicular to the direction of flight; while the term "rib" members will be applied to structural members used to form the structure and extending in the direction of flight. The term "skin covering" is also applied to the covering, preferably of metal sheet, which covers the structure. The use of the term "spar," and "rib," while applied in quite the conventional manner to classify wing structural members by the direction in which they extend in the structure, will be understood to define two types of structural members which by their shape and means for assembly together and to the skin covering provide novel features of the wing structure herein disclosed.

Figure 6:
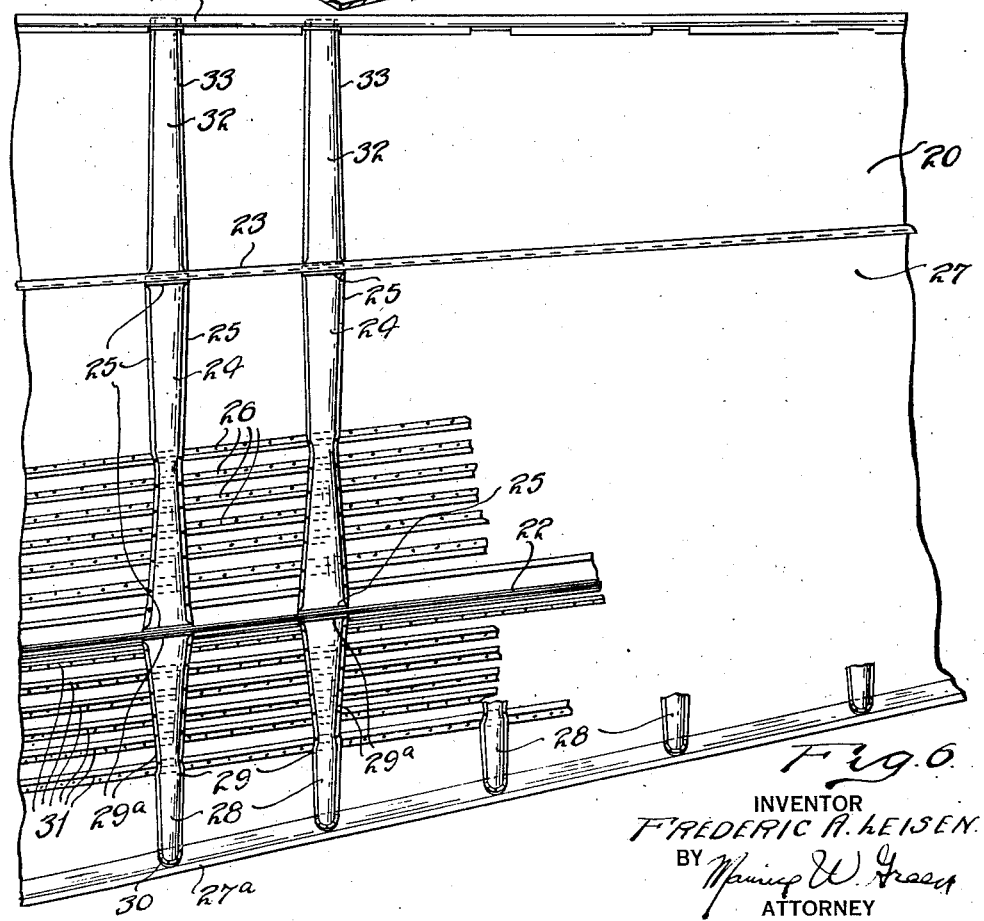
Fig. 6 is a plan view of the interior a portion of the upper half of the wing section shown in Fig. 1, the view being in the direction 6—6 shown in Fig. 1, and shows spars and the members necessary to form two rib portions, it being understood that the rib sections are repeated at intervals along the span of the wing as indicated.

Continuing with the description of Fig. 1, the wing is shown, and is preferably made in two halves, an upper portion 20 and a lower portion 21, which portions are separately constructed and assembled before the two units are secured together, although some of the novel structural features herein disclosed may be applicable to structures not built up in halves. Considering the upper portion 20 shown in Fig. 1 and also shown in an interior plan view in Fig. 6, there are spar members 22 and 23, the spar member 22 serving as the upper half of a front spar and the spar member 23 as the upper half of a rear spar for the wing shown. The spar members 22 and 23 are spaced by a rib channel member 24 which is formed with flanges as shown in Figs. 1, 5 and 6, which flanges are continuous along the outer open portion of the member and also continue to the ends and abut the spars 22 and 23 as shown in Figs. 1 and 5. It is also important that the rib flanges 25 are formed with offset portions 25a adjacent spar 22 and offset portions 25b adjacent spar 23.

The offset portions 25a provide a space adjacent the spar 22 to receive the spaced auxiliary spar members 26, six of which are shown in Figs. 1 and 6. The spar members extend spanwise of the wing between, a skin covering 27 and the offset flange portion 25a of the rib channel member 24. It is understood that there are a plurality of the rib members 24 at spaced intervals along the wing span as indicated in Fig. 6 and the auxiliary spar members 26 are secured to each of these rib members at flange portions 25a, the members 26 being also secured to the skin covering, the securing being accomplished by riveting, welding or other recognized methods available.

Extending forwardly toward the leading edge from the spar 22 is a leading edge former rib channel which is similar in general shape to rib channel 24 and has continuous flanges 29 with an offset portion 29a adjacent spar 22, the flanges extending also to abut the spar 22 and to also form a flat section 30 near the leading edge. The offset portion 29a of flange 29 provides space for the securing of auxiliary spar members 31 between the flanges 29a and the skin covering 27 in a similar manner to that described for spar members 26.

The flat section 30 near the leading edge formed by the continuing flange 29 of rib channel 28 provides a very unique means of securing the skin covering adjacent the leading edge as will be apparent on inspection of Figs. 1 and 4 where it appears that the skin covering 27 is carried down over the blunt flat section 30 and terminated in a flange 27a and fastened to a similar flange on the lower half of the wing in a manner later to be described.

Extending rearward of spar member 23 and forming the trailing edge is the rib channel 32 having a cross section similar to rib channels 24 and 28 and with flanges 33 continuous and extending to abut the spar member 23 and having an offset portion 33a adjacent the spar to receive the flanged portion of spar member 23. The skin covering 27 extends over the flanges 33 and is secured thereto and is continued and bent over the trailing edge at 27b as shown in Figs. 1 and 6.

The view of Fig. 6, which is an interior view of the upper half taken on line 6—6 of Fig. 1, shows the general arrangement of the several parts, and particularly shows that the rib sections 28, 24 and 32 are repeated at spaced intervals along the span of the wing. It also shows the auxiliary spar members 26 and 31 as extending over the span of the wing and secured both to the skin covering 27 at suitable intervals and secured also to the flanges of each spaced rib channel crossed by these members. It is evident on consideration of Figs. 1 and 6 and the structure so far described that in building up the half of the wing shown that the parts are accessible for completing their assembly, it being possible for instance to contact both inside and outside of the surfaces being secured with tools suitable for welding, riveting, or other type of fastening.

It is important to note and will be understood from the foregoing that the upper half 20 so far described can be built up as a separate unit entirely apart and independent of the lower half 21. The structure of the lower half is similar in that it is made up of front spar member 35, rear spar member 36, rib members 37, 38, 39, each having continuous flanges 40, 41, 42 respectively, with offset portions as in the top half, with auxiliary spar members 43 and 44 rearwardly and forwardly of the spar 35 (Fig. 1).

The skin covering 45 extends over the lower half of the wing and terminates forwardly in a flange 45a, as shown in Fig. 4 and terminates in the rear at the turned up edge 39a of rib member 39 (Fig. 1). It is noted that an opening is left between the end of the skin covering 45 at 39a and the turned over edge 27b of the upper skin covering 27 at the trailing edge. This opening is to be subsequently used for the assembly of a wing flap, not shown in the drawings. However, the opening ahead of the edge 27b, makes it possible to gain entry into the interior of the wing for the purpose of completing the assembly of the two halves of the rear spar portions 23 and 36 by means of rivets or other fastening thru rearwardly projecting flanges 51 on these members. On reference to Fig. 1, it will be apparent that the flanges 51 abut, and can be reached through the opening between the points 39a and 27b. After the above connection is completed, the structural members 51c may be secured in place for the purpose of definitely spacing the rib members 32 and 39. The portion of the wing shown in Fig. 1 is near the root thereof and for portions of the wing near the tip, where the aileron is fastened rearwardly of the spar 23, 36, it is also possible to gain access to the rear of this spar for the purpose of fastening the two halves at the flanges 51 as in the case of the root section shown in Fig. 1.

With the two halves of the structure separately assembled as above described, the two parts are joined together by securing the rear spar portions 23 and 36, as above mentioned, and also by securing together the projecting portions of spar members 22 and 35 for the front spar as shown in Figs. 1 and 5. Rivets are shown in Fig. 5, and may be used to complete the fastening or any fastening such as welding or other suitable securing means may be used.

At the leading edge the previously mentioned flanges made from the skin covering, i. e. 27a and 45a, are secured together with an angle member 52, secured therebetween, as shown in Fig. 4. This formation of a flanged section from the skin covering, or the other forwardly extending portion of the wing, makes a relatively blunt edge with a central flange as shown in Figs. 1 and 4. For the purpose of forming a curved leading edge, a sheet 53 of sufficient length to bend backwardly and contact the skin covering rearwardly of the blunt portion as at 53a and 53b, as shown in Fig. 4, is secured at approximately its center to the angle member 52. This sheet, before bending, is of generally rectangular form and extends over the span of the wing at the leading edge and may be tapered to conform to the taper of the wing. It is noted, however, that the fact that the bend may be finally completed after the fastening at the angle 52 is completed makes it possible to put rivets in the leading edge and have access to both sides of the members during this process, and to subsequently bend the edges of the member 53 to the positions 53a and 53b, where suitable fastening may be provided, such as screws, rivets, or other suitable means.

The type of connection for the spar halves 22 and 35 shown in Fig. 1 and at the left in Fig. 5 is intended to be used for only a portion of the span near the root of the wing adjacent the fuselage or body, while a different form of securing means shown in cross section in Fig. 2 and in perspective at the right in Fig. 5 is intended for the portion of the wing nearer the tips. With this type of joint a series of fittings 55 secured to a top spar member 56 at intervals along the span and a similar series 57 secured to the lower spar member (Figs. 2 and 5). Each of these fittings has a circular opening therein as shown at 55 in Fig. 2 suitable for receiving a round rod 59 which will serve to secure the upper and lower halves together when the rod is inserted in the aligned openings of fittings 55 and 56.

The form of joint shown specifically in Figs. 2 and 5 is of a type generally designated as a piano hinge joint; however, it is intended that a modified form of joint, such as is shown in Fig. 3, may be substituted and it is apparent that this type of joint will prevent twisting. The details of this joint are shown in Fig. 3 and formed portions 61 and 62 are secured to the inwardly extending members of spar portions such as portions 56 and 58. These members have opposed openings therein formed with enlarged portions at the top thereof suitable for receiving an interlocking member extending to both openings as is shown at 60 in Fig. 3. The member is preferably an extruded metal rod of suitable cross section and of length of the joint to be completed, in this case extending over the portion of the wing span employing this type of joint.

It is apparent that the opposed openings in the members 61 and 62 are so relatively shaped and positioned as to receive a single interlocking member 60, and to complete a locking of the two abutting members at 63 and 64 when the member 60 is pushed into place longitudinally and spanwise of the spar. It will be apparent on inspection of Fig. 3 that the joint when completed will assure a solid connection because of the abutting faces 63 and 64 and the enlarged ends on the member 60 which produce the interlock.

Although I have described my invention as applied specifically to a wing structure, it will be apparent that some features may be applicable to aircraft structures generally such, for instance, as fuselage structures which might employ certain features to advantage. Various forms of tapered rectangular and other shapes of wings could also use the structure to advantage. I therefore do not desired to limit myself to the specific details disclosed, but rather to the scope of the following claims.

I claim:

1. In a metal airplane wing having a metal skin, a spar, a rib at each side of the spar and extending transversely to and at one end abutting said spar and comprising a channel U-shape in cross section having the legs thereof directed towards the skin and having each leg terminating in an outwardly bent side flange disposed parallel to the skin, the rib being longitudinally shaped to provide a substantial space vertically between the skin and flanges along a substantial length of rib adjacent the spar while obtaining contact between the flanges and skin beyond the end of said length, spanwise stiffeners disposed in said space and contacting the flanges and skin, said one end of each rib terminating in an outwardly directed, vertically disposed end flange in contact with the spar and which merges into and joins the side flanges along the length of the rib, means fastening the skin to the flanges and stiffeners, means fastening the stiffeners to the rib flanges in contact therewith and means fastening the end flange to the spar.

2. In a metal airplane wing having a metal skin, a spar, a rib at each side of the spar and extending transversely to said spar, said rib comprising a channel U-shape in cross-section having its legs directed towards the skin with each leg termination in an outwardly bent side flange disposed parallel to the skin, the rib being longitudinally shaped to provide a substantial space vertically between the skin and flanges along a substantial length of rib adjacent the spar while obtaining contact between the flanges and skin beyond the end of said length, spanwise stiffeners disposed in said space and contacting the flanges and skin, means fastening the end of said rib to the spar, and means fastening the skin to the flanges and stiffeners.

3. In a metal airplane wing having a metal skin, a spar, a rib at each side of the spar and extending transversely to and at one end abutting said spar, said rib comprising a channel U-shape in cross-section having its legs directed towards the skin with each leg terminating in an outwardly directed flange disposed parallel to the skin and in contact therewith, each rib terminating at its end in an outwardly directed, vertically disposed end flange in contact with the spar with said flange merging into and joining the flanges along the length of the rib, means fastening the skin to the flanges along the rib and means fastening the end flange to the spar.

4. An airplane wing comprising spaced front and rear spars, a series of upper ribs extending between the spars, a series of upper ribs projecting forwardly and rearwardly from the front and rear spars respectively, similar series of lower ribs between the spars and projecting forwardly from the front spar and rearwardly from the rear spar, a skin covering the upper series ribs, a skin covering the lower series of ribs, each of said spars comprising upper and lower parts fastened vertically between the upper and lower ribs so that the two halves of the wing can be made separately and then assembled, and each of said ribs comprising a channel U-shape in cross-section having its legs directed towards its skin covering with each leg terminating in an outwardly bent flange disposed parallel to the skin and with that end of each rib next to a spar having an outwardly directed, vertically disposed end flange in contact with the spar, said end flange merging into and joining the flanges along the length of the rib, the ribs at opposite sides of one spar being longitudinally shaped to provide a substantial space vertically between the skin and flanges along a substantial length of the ribs while leaving the flanges beyond the ends of said space in contact with the skin, spanwise stiffeners in said space, means fastening the contacting skin and flanges together, means fastening the stiffeners to the flanges and skin, and means fastening the end flanges to the spars.

5. A rib for airplane wings comprising a channel U-shape in cross-section and having its legs terminating in oppositely and outwardly directed side flanges for attaching purposes, one end of the channel having an outwardly directed flange extending around the end edge which joins and constitutes a continuation of said side flanges, said rib having a substantial linear portion adjacent said end wherein the side flanges are substantially offset from the side flanges along an adjacent linear portion to provide a pocket or recess for accommodating wing stiffeners.

6. In a metal airplane wing having a pair of spars, a rib extending between and connected at its ends to the spars, said rib having a continuous flange along one linear edge for attaching purposes and being shaped longitudinally to place a substantial length of said flange adjacent one spar in offset relation to the remainder of the flange, a skin disposed over the rib in contact with and fastened to said remainder flange, and spanwise stiffeners between and connected to the skin and offset flange.

7. In a metal airplane wing having a pair of spars, a rib channel extending between and connected at its ends to the spars, and being U-shape in cross-section with the legs thereof terminating in flanges extending continuously along the rib, the rib being shaped longitudinally to place the flanges along a substantial length adjacent one spar in offset relation to the remainder length of the flanges, a skin disposed over the rib in contact with and fastened to said remainder flanges, and spanwise stiffeners between and connected to the skin and offset flanges.

8. A rib for airplane wings comprising a channel U-shape in cross-section and having its legs terminating in oppositely and outwardly directed side flanges for attaching purposes, the rib having a substantial linear portion wherein the side flanges are substantially offset from the side flanges along an adjacent linear portion to provide a pocket or recess for accommodating wing stiffeners.

FREDERIC A. LEISEN.